United States Patent [19]

Shirdavani

[11] Patent Number: 4,907,676
[45] Date of Patent: Mar. 13, 1990

[54] LOW PROFILE, REMOTELY OPERABLE VALVE

[76] Inventor: Hossain A. Shirdavani, 14425 NE. 37th Pl., Bellevue, Wash. 98007

[21] Appl. No.: 332,596

[22] Filed: Apr. 3, 1989

[51] Int. Cl.$^4$ ........................................... E01M 11/04
[52] U.S. Cl. .................................. 184/1.5; 251/144; 251/294; 251/321
[58] Field of Search ................ 184/1.5; 251/294, 144, 251/321

[56] References Cited

U.S. PATENT DOCUMENTS

| | | | |
|---|---|---|---|
| 3,447,459 | 11/1969 | Schossow | 184/1.5 |
| 3,448,771 | 6/1969 | Bales | 251/294 |
| 3,537,679 | 11/1970 | McCarthy | 251/294 |
| 3,650,352 | 3/1972 | Schwary | 184/1.5 |

Primary Examiner—Douglas Hart
Attorney, Agent, or Firm—Robert W. Jenny

[57] ABSTRACT

The valve comprises a flat, rectangular body attachable to the drain fittings of crankcases by an attachment fitting having passages which allow flow through the fitting into the body. The body has an outlet port in one of its sides. The port is opened and closed by a seal attached to a slider which slides on bolts extending from the side having the port. The slider is forced toward the port by coil springs on the bolts and moved away from the port to open the valve by tension applied by the core wire of a Bowden cable. The cable extends from a header piece held between the springs on the bolts and the bolt heads to an operating mechanism attached to a readily accessible point on the vehicle in which the crankcase is used. A lever, pivoted to the base of the operating mechanism, is operable to apply tension to the core wire of the cable to open the valve and can be moved over center to hold the valve open. Moving the lever back over center allows the springs to close the valve.

1 Claim, 2 Drawing Sheets

LOW PROFILE, REMOTELY OPERABLE VALVE

BACKGROUND OF THE INVENTION

1. Field:

The subject valve is in the field of apparatus for control of fluids, more specifically valves for control of fluid out of crankcases of internal combustion engines and, still more specifically, such valves which are operable from a point remote from the valve.

2. Prior Art:

There is much prior art in this specific field. The U.S. Patents listed below disclose the closest prior art known to the inventor of the subject valve: U.S. Pat. Nos. 1,995,174 3,650,352 3,477,459 4,086,981 4,319,664.

These examples of prior art have their relative advantages and disadvantages but, to the knowledge of the subject inventor, no valve in this specific field is known to have achieved significant commercial success. This lack of success is believed to be attributable to unacceptable relationships of cost and reliability in prior art valves. Accordingly, the prime objective of the subject invention is to provide, for draining oil from engine crankcases, a remotely operable valve which combines an acceptable combination of cost and reliability of the valve. A second objective is that the valve have a low profile to minimize the chances of damage caused by the decrease in ground clearance caused by installation of the valve.

SUMMARY OF THE INVENTION

The subject valve is attachable to crankcases of engines in place of the drain plug which is normally used to drain oil used in the crankcase. A handle or lever is installed in the vehicle in which the engine is used, the point of installation being more readily accessible than the conventional drain plug. The handle is interconnected with the valve by Bowden cable so that the valve can be operated from the easily accessible point at which the handle is installed. For purposes of this disclosure, Bowden cable comprises a tube-like casing which is a close wound coil spring and is thus a flexible casing and a core wire which is slidable in the casing, capable of transmitting tension and compression forces through the cable. The valve is held closed by springs so that it will automatically close if there is any failure in the operating mechanism. The handle is arranged so that the springs which normally hold the valve closed will hold it open when the operating handle is set in the "open" position.

The valve comprises a body, a fixture for attaching the body to the outlet of the crankcase and two bolts installed in threaded holes in one side of the body. An oil outlet hole is in the same side of the body between the threaded holes. The valve further comprises a slider carried by the two bolts. One face of the slider is fitted with an elastomeric seal which fits against the outlet hole to close the valve. The slider and seal are forced against the body by two coil springs, one on each of the two bolts. Also, there is a head piece bridging the two bolts, situated against the heads of the bolts and held there by the springs. In the center of the head piece is a counterbored hole with its axis parallel to the axes of the holes in the headpiece for the bolts. One end of the casing of the Bowden wire which operates the valve is set into the counter bore of the hole in the center of the head piece and the core wire of the Bowden cable extends through the hole and is connected to the slider so that tension applied to the core wire can overcome the forces applied to the slider by the springs, move the seal away from the outlet hole and thus open the valve. Relieving the tension in the core wire allows the seal to reseat in the outlet, thus closing the valve.

The other end of the casing of the Bowden wire is clamped to a fitting which is attached to the accessible point on the vehicle and the other end of the core wire of the cable is pivotally attached to a lever (handle) which is pivotally attached to the fitting. Moving the lever to apply tension to the core wire opens the valve. Moving the lever so that the pivot for attaching the core wire goes "over center" results in the tension in the core wire holding the lever over center and thus holding the valve open. Once the lever is moved back over center, the springs at the valve move the handle, core wire, slider and seal to close the valve. The apparatus is economical to manufacture and reliable because of its simplicity. It is economical to manufacture also because a significant portion of its components are standard, commercially available parts.

The valve is described in more detail below with reference to the attached drawings.

BRIEF DESCRIPTION OF THE DRAWINGS

FIG. 1 is a perspective view of the subject valve installed on a crankcase of an engine in a vehicle and the associated operating apparatus mounted at an easily accessible point on the vehicle.

DETAILED DESCRIPTION OF THE INVENTION

Figure 1A:
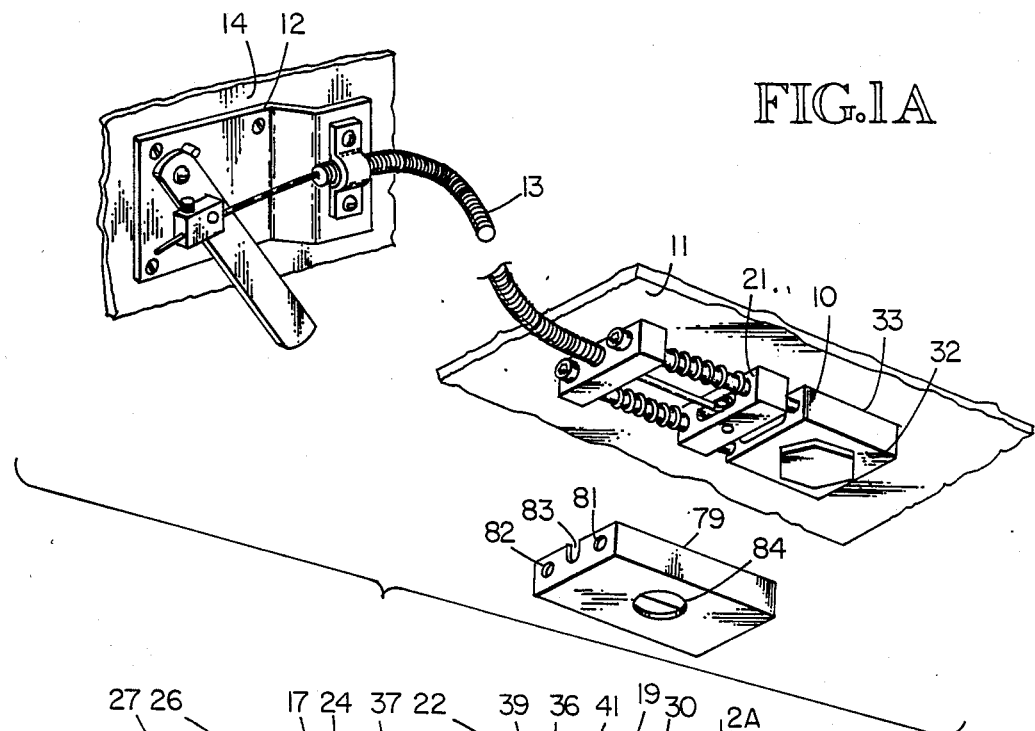
FIG. 1A shows a cover for the moving parts of the valve.

The invention is a remotely operable drain valve for the crankcases of engines or type like. In FIG. 1 valve 10 is installed at the internally threaded drain fitting (not visible) of crankcase 11. The valve is operated by the operating apparatus 12 via cable apparatus 13, the operating apparatus being attached to schematically represented vehicle part 14.

Figure 2:
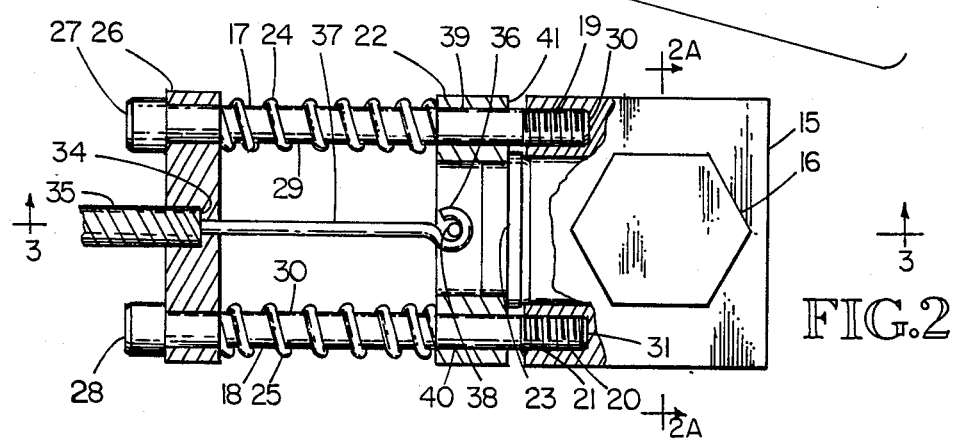
FIG. 2 is a sectional view of the valve looking up at the crankcase.

FIG. 2 is a bottom view of the valve. The valve comprises body 15, attachment fitting 16, bolts 17 and 18 threaded into threaded holes 19 and 20 in side 21 of the body, slider 22 carried in the bolts, seal 23 attached to the slider, compression springs 24 and 25 and head piece 26, also carried on the bolts. The bolts have heads 27 and 28, shanks 29 and 30 and threaded ends 30 and 31. Faces 32 and 33 (FIGS. 1 and 2A) of the body are flat, planar and parallel. End 34 of Bowden cable casing 35 is set into the head piece with end 36 of the Bowden cable core wire 37 attached at 38 to the slider. The slider has holes 39 and 40 oriented to allow the slider to slide on the bolt shanks and these holes are perpendicular to face 41 of the slider.

Figure 2A:
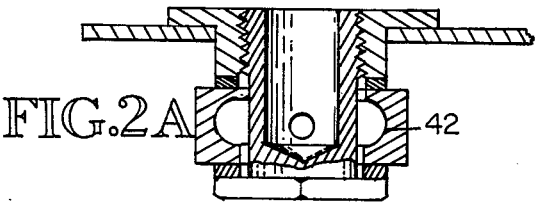
FIG. 2A is a sectional view taken at 3'—3' in FIG. 2 showing the width of the cavity.

FIG. 2A, a sectional view taken at 3'—3' in FIG. 2, shows the width of cavity 42 with respect to fitting 16.

Figure 3:
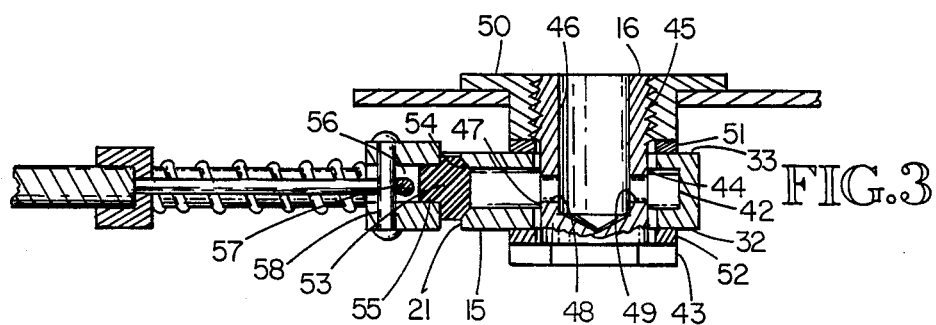
FIG. 3 is a sectional view of the valve taken at 3—3 in FIG. 2.

FIG. 3 is a sectional view of the valve taken at 3—3 in FIG. 2. Attachment fitting 16 has a head 43, a cylindrical shank 44, a threaded end 45, a bore 46, an outer surface 47 and passages 48 and 49. The fitting is threaded into internally threaded drain fitting 50 to hold valve body 15 in place with ring shaped gaskets 51 and 52 preventing leakage between the body and drain fitting and head 43 of the fitting and the body respectively. The body cavity 42 extends around the attachment fitting and opening at side 21 of the body. Bore 46 and passages 48 and 49 allow oil in the crankcase to flow into cavity 42. Seal 53 is elastomeric and, when pressed into the port 54 of the cavity in side 21, prevents the oil from flowing through the valve and out of the crankcase. Extension 55 on seal 53 extends into hole 56 in the slider and the seal is held in place by adhesive. Hook 57 on bore wire end 37 fits into hole 56 in the slider and is held in place by pin 58. It can be understood at this point that tension applied to the core wire sufficient to overcome the installed forces of the springs will move the slider and seal away from the opening in the body and allow the oil to drain from the crankcase.

Figure 4:
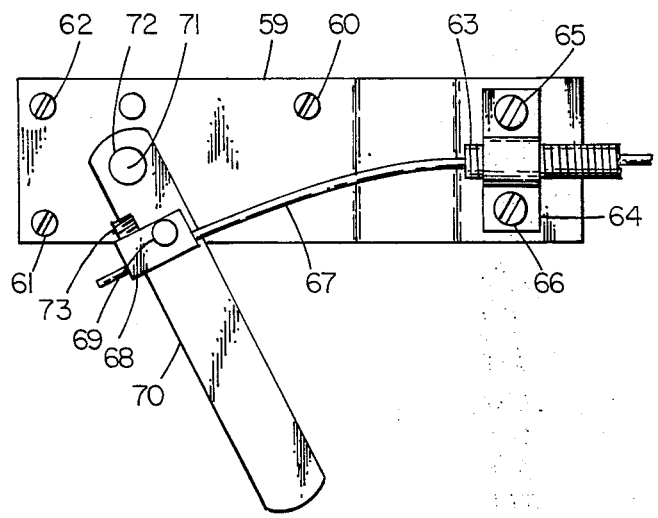
FIG. 4 is a planar view of the operating mechanism in the valve closed configuration.

FIG. 4 is an elevation view of operating mechanism for applying and maintaining tension in the core wire to allow oil drainage from the crankcase. Base 59 is attached to vehicle structure by any suitable means well known in the art, sheet metal screws 60, 61 and 62 in this embodiment. End 63 of the casing of the Bowden cable is attached to the base by clamp 64 held in place by sheet metal screws 65 and 66. End 67 of the core wire of the Bowden cable is pivotably connected by fitting 68 and pin 69 to lever 70 which is pivoted to the base at 71 by pin 72. The core wire extension through fitting 68 is set by set screw 73. With lever 70 positioned as shown, there is no tension in the core wire and the valve is closed.

Figure 4A:
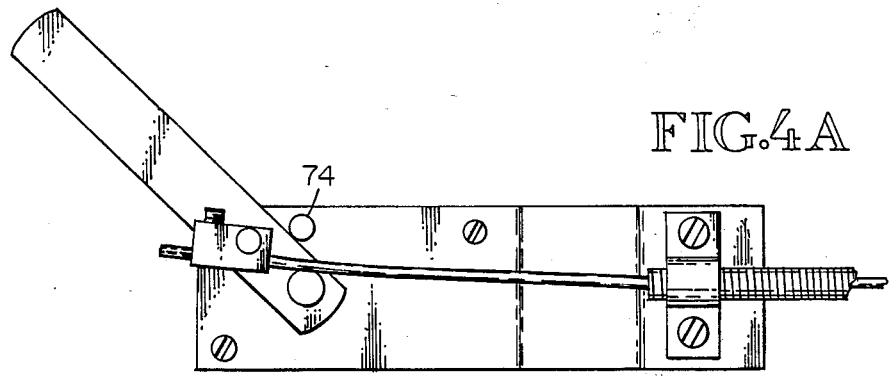
FIG. 4A is a planar view of the operating mechanism in the valve open configuration.

In FIG. 4A the lever has been rotated counterclockwise so that pin 69 is farther from end 63 of the Bowden cable and the resulting motion of the core wire has compressed the springs of the valve and opened it and there is tension force in the wire. Because pin 69 is now above pin 72, the tension force in the wire tends to cause continued counterclockwise rotation of the lever and this is prevented by stop pin 74. In this configuration the compression force in the valve springs holds the valve open.

Figure 5:
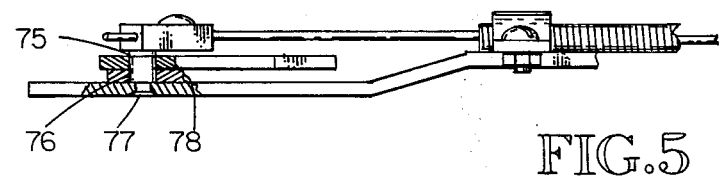
FIG. 5 is a sectional top view of the operating mechanism.

FIG. 5 is a sectional top view of the operating mechanism, showing more details of its parts and assembly. Pin 72 has a head 75, is stepped to fit hole 76 and is peened at end 77 to hold it in place. Washer 78 spaces the lever from the base. Pin 69 is similar in design to pin 72.

FIG. 1A shows a cover 79 fittable over the moving parts of the valve with end 80 between the heads of the bolts and the headpiece, the bolts fitting through holes 81 and 82 and the Bowden cable in notch 83. Hole 84 is the drain hole through the cover.

It is considered to be understandable from this description that the subject invention meets its objectives of providing a remotely operable valve for crankcase drains, the valve and its associated operating mechanism combining an acceptable combination of cost and reliability. Also, its flat, rectangular envelope provides a low profile and therefore a small reduction in road clearance because of its installation.

It will be further understood that while one embodiment of the invention is described herein, other embodiments and modifications of the one described are possible within the scope of the invention which is limited only by the scope of the attached claims.

What is claimed is:

1. A remotely operable valve attachable to an internally threaded fitting, said valve comprising:

a body having two parallel, planar faces and at least one side, a cavity, a port in said at least one side opening into said cavity and a cylindrical hole through said body and said cavity, said hole having a first diameter and an axis perpendicular to said two planar faces, said body further having two threaded holes extending into it and having parallel axes essentially parallel to said planar faces, said threaded holes being adjacent to said port, two bolts having heads, shanks and threaded ends, said threaded ends being threaded into said threaded holes whereby said shanks are parallel to each other, a header piece having first and second holes, sized and oriented whereby said header piece is installable on and is installed on said shanks adjacent to said heads, a slider having a slider face and third and fourth holes sized and oriented perpendicular to said slider face and whereby said slider is installable on and is installed on said shanks with said slider face facing said port, two compression springs, installed one on each of said shanks of of said two bolts between said header piece and said slider, whereby said springs apply forces to move said slider toward said body, a seal installed on said slider face whereby when said slider face is moved toward said body by said springs said seal closes said port, apparatus for moving said slider, features in said header piece and said slider for attaching said apparatus to move said seal away from said port against said forces applied by said springs, whereby said valve is opened, and to allow said forces applied by said springs to move said seal against said port, whereby said valve is closed, an attachment fitting having a head, a cylindrical shank, a threaded end, a bore in said shank, said cylindrical shank having an outer surface and a second diameter such that said cylindrical shank fits in said cylindrical hole through said body, said fitting having at least one passage between said outer surface and said bore, first and second ring shaped gaskets, whereby with said attachment fitting inserted through said hole through said body with said first gasket between said head of said attachment fitting and one of said two planar parallel faces and said second gasket against the other of said two planar parallel faces and said threaded end of said attachment fitting threaded into said internally threaded fitting, said valve is attached to said internally threaded fitting.

* * * * *